(12) United States Patent
Nowak et al.

(10) Patent No.: US 6,517,619 B1
(45) Date of Patent: Feb. 11, 2003

(54) FLUORESCENT INKS FOR WRITING INSTRUMENTS USING FLUORESCENT DYES AND WHITE PIGMENTS

(75) Inventors: Michael T. Nowak, Simpsonville, SC (US); Qingping Chen, Simpsonville, SC (US)

(73) Assignee: BIC Corporation, Milford, CT (US)

( * ) Notice: Subject to any disclaimer, the term of this patent is extended or adjusted under 35 U.S.C. 154(b) by 171 days.

(21) Appl. No.: 09/645,284

(22) Filed: Aug. 24, 2000

(51) Int. Cl.$^7$ ............................................. C09D 11/00
(52) U.S. Cl. ....................... 106/31.32; 106/31.64; 106/31.49; 106/31.78; 106/31.58; 106/31.86; 106/31.65
(58) Field of Search ................... 106/31.32, 31.64, 106/31.49, 31.78, 31.58, 31.86, 31.65; 523/161; 252/301.35

(56) References Cited

U.S. PATENT DOCUMENTS

| | | | |
|---|---|---|---|
| 3,446,564 A | | 5/1969 | Horie .......................... 401/209 |
| 3,533,708 A | | 10/1970 | Horie .......................... 401/209 |
| 3,572,954 A | | 3/1971 | Cheron ........................ 401/18 |
| 3,873,218 A | | 3/1975 | Yoshida ....................... 401/292 |
| 3,922,232 A | * | 11/1975 | Schein ................. 252/301.2 R |
| 3,951,555 A | | 4/1976 | Wittnebert et al. .......... 401/217 |
| 3,997,498 A | | 12/1976 | Reese .................. 260/33.8 UA |
| 4,079,026 A | | 3/1978 | Mone ..................... 260/22 CQ |
| 4,186,020 A | | 1/1980 | Wachtel ........................ 106/22 |
| 4,664,711 A | * | 5/1987 | Kawaguchi et al. ...... 106/31.28 |
| 4,671,691 A | | 6/1987 | Case et al. ................... 401/142 |
| 4,726,845 A | | 2/1988 | Thompson et al. ............ 106/25 |
| 5,279,652 A | * | 1/1994 | Kaufmann et al. ....... 106/31.36 |
| 5,294,664 A | * | 3/1994 | Morrison et al. ....... 252/301.35 |
| 5,591,787 A | * | 1/1997 | Schlennert et al. .... 252/301.35 |
| 5,630,868 A | * | 5/1997 | Belmont et al. ......... 106/31.28 |
| 5,643,356 A | * | 7/1997 | Nohr et al. ............... 106/31.49 |
| 5,683,500 A | * | 11/1997 | Kawasumi et al. ........ 106/31.6 |
| 5,698,614 A | * | 12/1997 | Ueda et al. ............... 106/31.01 |
| 5,785,746 A | * | 7/1998 | Kito et al. ................ 106/31.58 |
| 5,877,235 A | * | 3/1999 | Sakuma et al. .......... 106/31.58 |
| 5,919,858 A | * | 7/1999 | Loftin ..................... 106/31.32 |
| 5,942,027 A | | 8/1999 | Ikai et al. ................. 106/31.33 |
| 5,990,201 A | * | 11/1999 | Miyazaki et al. ........ 106/31.13 |
| 6,200,053 B1 | * | 3/2001 | Asami et al. ............. 106/31.13 |
| 6,261,352 B1 | * | 7/2001 | Asami ...................... 106/31.58 |
| 6,398,441 B1 | | 6/2002 | Takayangi .................. 401/192 |

FOREIGN PATENT DOCUMENTS

| | | |
|---|---|---|
| JP | 2000-160087 | 6/2000 |
| WO | WO00/20522 | 4/2000 |

* cited by examiner

*Primary Examiner*—Helene Klemanski
*Assistant Examiner*—Veronica F. Faison
(74) *Attorney, Agent, or Firm*—Pennie & Edmonds LLP

(57) ABSTRACT

A non-aqueous fluorescent ink composition suitable for use in writing instruments is described comprising a soluble fluorescent colorant, a solvent, and an opacifying agent. The ink composition may also include resins, stabilizers, surfactants, lubricants and other inert additives. The fluorescent ink composition exhibits a brilliant appearance in masscolor and when written on paper.

31 Claims, No Drawings

FLUORESCENT INKS FOR WRITING INSTRUMENTS USING FLUORESCENT DYES AND WHITE PIGMENTS

FIELD OF INVENTION

The present invention relates to solvent-based inks for writing instruments using fluorescent dyes and opacifying pigments.

BACKGROUND OF INVENTION

Writing instruments which are used to manually print text are in common use. The inks in these devices have traditionally used dyes (blue, black, red, green, etc.) which may exhibit a bright appearance on paper but do not exhibit a bright appearance in masscolor.

Current bright ink pens are either gel ink pens requiring a grease follower and point seal feature or free ink pens wherein the ink viscosity is low (less than 1000 cPs) and a flow control mechanism such as a baffle and/or capillary connectors is required. U.S. Pat. No. 4,671,691 to Case et al. and U.S. Pat. No. 4,726,845 to Thompson et al. disclose aqueous gel ink pens. Disadvantages to gel ink pens include additional production steps, additional cost to their production and short shelf life. U.S. Pat. No. 3,446,564 to Horie; U.S. Pat. No. 3,533,708 to Horie; U.S. Pat. No. 3,572,954 to Cheron; U.S. Pat. No. 3,873,218 to Yoshida; and U.S. Pat. No. 3,951,555 to Wittnebert et al. disclose writing instruments utilizing liquid reservoirs employing porous ink feed rods. Disadvantages to using porous ink feed rods include a potential failure to provide a sufficiently continuous flow of ink through the writing instrument tip to the paper.

U.S. Pat. No. 4,664,711 to Kawaguchi et al. discloses a fluorescent ink composition comprising (1) 5 –40% titanium dioxide treated with an alkaline earth metal or aluminum salt of a fatty acid; (2) organic resins, and (3) an organic solvent capable of dissolving the resins. The particle size of the $TiO_2$ is from 0.05 to 0.5 micron. U.S. Pat. No. 4,664,711 does not disclose treated titanium dioxide used below 5% of the formulation, nor any other opacifying agent other than $TiO_2$.

U.S. Pat. No. 4,186,020 to Wachtel discloses a fluorescent printing ink comprising (1) an organic binder or carrier which dissolves in an organic solvent base and does not interfere with the fluorescence of the fluorescent dye or pigment component; (2) one or more fluorescent dye components which dissolve in the binder solution; (3) an organic phosphor, which may be a fluorescent dye or pigment of extremely high intensity and which dissolves in the organic solvent, and, optionally, (4) an organic brightener, and (5) an evaporation retardant. U.S. Pat. No. 4,186,020 does not disclose the use of non-organic opacifying agents used as brighteners.

U.S. Pat. No. 5,698,614 to Ueda et al. discloses a fluorescent ink composition comprising (1) an organic solvent comprising propylene glycol monomethyl ether, (2) a fluorescent pigment dissolved in the organic solvent comprising propylene glycol monomethyl ether and (3) a ketone resin. The ink composition of Ueda is particularly suitable for use in marking pens which have an ink reservoir composed of a bundle of fibers, wherein the ink composition is supplied from the ink composition by making use of capillary phenomenon. U.S. Pat. No. 5,968,614 does not disclose any opacifying agents used as brighteners.

U.S. Pat. No. 5,942,027 to Ikai et al. discloses an ink for a ballpoint pen comprising an organic solvent, colorant, resin, and fine particle silica having a particle diameter of 7 to 40 nm. The silica is used as an anti-seepage additive to control leakage from ballpoint pens. U.S. Pat. No. 5,942,027 does not disclose fluorescent dye nor does it disclose opacifying agents used as brighteners as recited in the present invention.

U.S. Pat. No. 3,997,498 to Reese et al. discloses a correction fluid composition comprising (1) an opacifying agent in an amount from about 15 to 35% by weight, (2) a halogenated ethane solvent, and (3) a resin. U.S. Pat. No. 3,997,498 does not disclose the use of these materials with fluorescent materials. Additionally, it does not disclose opacifying agents used below 5% by weight which act as brightening agents.

There is a need for fluorescent ink that can be used with traditional writing instrument mechanisms and solvent systems. Also desired is a fluorescent ink whose ink produces a particular brilliant appearance both within the ink containing member or tube of the writing instrument and on paper. Also desired is the ability to make many different colors and blends of ink for bright ink writing instruments. This invention satisfies these needs.

SUMMARY OF INVENTION

The object of the present invention is to provide fluorescent inks exhibiting a brilliant appearance in clear ink delivery members within clear pen barrels which can be delivered to paper reliably from a writing instrument. This fluorescent ink exhibits the same brilliance on paper as in the clear ink delivery member.

The ink composition of the present invention when placed in an optically transparent or translucent member or tube and mounted within an optically transparent or translucent barrel produces a brilliant appearance. The brilliance of the fluorescent ink is enhanced by the presence of an opacifying agent, which acts as a brightening agent. Although not intended to be limiting, it is believed that the combination of a white opacifying agent with a fluorescent dye enhances the brilliance of the fluorescent dye in the ink.

In a first embodiment of the present invention, a fluorescent ink composition for use in writing instruments comprises an organic solvent, a resin, a solvent soluble fluorescent colorant and an opacifying agent, whereby the opacifying agent acts as a brightener. Preferably, the ink composition has a viscosity from about 1,000 cPs to about 500,000 at 20° C. More preferably, the viscosity of the ink composition is from about 2,000 to about 50,000 cPs. Most preferably, the viscosity of the ink composition is from about 3,000 to about 30,000 cPs.

Preferably, the writing instrument is a ballpoint pen.

The fluorescent colorant may be used alone or in the form of a mixture of two or more fluorescent colorants. Preferably, the fluorescent colorant is present in the ink composition in amounts from about 0.1 to about 60 weight percent of the ink composition.

The opacifying agent may be used alone or in the form of a mixture of two or more opacifying agents. Preferably, the opacifying agent is an inorganic white pigment, such as silica, titanium dioxide and zinc oxide. Preferably, the opacifying agent has a particle diameter less than 1 micron. Depending on the refractive index of the opacifying agent, the amount of opacifying agent is from 0.1 to about 15.0% by weight of the ink composition.

When the refractive index of the opacifying agent is equal to or more than 2.0, the amount of the opacifying agent is from about 0.1 to 4.9 weight percent of the ink composition. Accordingly, one embodiment of the present invention is a fluorescent ink composition for use in a writing instrument comprising about 0.1 to 4.9 weight percent opacifying agent, with a refractive index of equal to or more than 2.0, a fluorescent dye, an organic solvent and a resin. Non-limiting examples of opacifying agents with a refractive index more than 2.0 are titanium dioxide (anatase and rutile), zinc oxide, zinc sulfide and zirconium oxide. Preferably, the particle diameter of these opacifying agents is from about 0.001 to about 5 microns. More preferably, the particle diameter of these opacifying agents is from about 0.01 to about 0.5 microns.

When the refractive index of the opacifying agent is less than 2.0, the amount of the opacifying agent is from about 0.1 to about 15 weight percent of the ink composition. Accordingly, another embodiment of the present invention is a fluorescent ink composition for use in a writing instrument comprising about 0.1 to about 15 weight percent opacifying agent, with a refractive index of less than 2.0, a fluorescent dye, an organic solvent and a resin. Non-limiting examples of opacifying agents with a refractive index less than 2.0 are silica, silicates, calcium carbonate, talc and china clay. Preferably, the opacifying agent is silica. Preferably, the particle diameter of the silica is from about 0.02 to about 0.6 microns.

The organic solvent may be used alone or in the form of a mixture of two or more organic solvents. Preferably, the organic solvent is from about 5 to about 90 weight percent of the ink composition. More preferably, the organic solvent is from about 20 to about 65 weight percent of the ink composition. Examples of organic solvents include, but are not limited to, glycols such as dipropylene glycol; glycol ethers such as triethylene glycol monobutyl ether; high boiling point esters such as octyl adipate, dioctyl sebacate; glycerin and its derivatives; ketones such as cyclohexanone; pyrrolidones, such as N-methyl pyrrolidone; lactones; high boiling point alcohols, such as benzyl alcohol; and mixtures thereof.

The resin may be used alone or in the form of a mixture of two or more resins. Preferably, the resin is present in amounts from about 0.1 to about 60 weight percent of the ink composition. Most preferably, the resin is present in amounts from about 1 to about 30 weight percent of the ink composition. Preferably, the resin is a ketone resin or a styrene-allyl alcohol copolymer.

In another embodiment of the present invention, the fluorescent ink composition further comprises a chemical dispersant. The chemical dispersant may be used alone or in the form of a mixture of two or more chemical dispersants. Preferably, the chemical dispersant is an oleophilic chemical dispersant, an acid function co-polymer chemical dispersant or soya lecithin. Preferably, the chemical dispersant is present in an amount not more than 10 weight percent of the ink composition. Most preferably, the chemical dispersant is present in an amount from about 0.1 to about 5 weight percent of the ink composition.

In another embodiment of the present invention, the fluorescent ink composition further comprises a stabilizer. The stabilizer may be used alone or in the form of a mixture of two or more stabilizers. Preferably, the stabilizer is present in the ink composition from about 0.1 to about 30 weight percent of the ink composition. More preferably, the stabilizer is present in an amount from about 0.1 to about 10 weight percent of the ink composition. Most preferably, the stabilizer is present in the ink composition from about 0.1 to about 5 weight percent of the ink composition.

In another embodiment of the present invention, the fluorescent ink composition further comprises a surfactant. The surfactant may be used alone or in the form of a mixture of two or more surfactants. Preferably, the surfactant is present in an amount not more than 10 weight percent of the ink composition. Most preferably, the surfactant is present in an amount from about 0.2 to about 5 weight percent of the ink composition.

In another embodiment of the present invention, the fluorescent ink composition further comprises an antioxidant. The antioxidant may be used alone or in the form of a mixture of two or more antoxidants. Preferably, the antioxidant is present in an amount from about 0.1 to about 30 weight percent of the ink composition. Preferably, the antioxidant is selected from the group consisting of tocopherals, butylated hydroxy toluene, eugenol and hydroquinone.

In another embodiment of the invention, a method for stabilizing an opacifying agent in the fluorescent ink composition of the present invention comprises: (a) blending a resin or resin mixture and an organic solvent or solvent mixture together; (b) blending a fluorescent colorant or mixture thereof with the resin and the organic solvent to form a mixture; and (c) dispersing the opacifying agent or opacifying agent mixture using a chemical dispersant under high-speed agitation and blending the mixture. Preferably, the chemical dispersant is selected from the group consisting of an oleophilic dispersing agent, an acid functional co-polymer dispersing agent and soya lecithin. Preferably the opacifying agent is supplied in dry form.

In another embodiment of the invention, a method for stabilizing an opacifying agent in the fluorescent ink composition of the present invention comprises: (a) using a pre-made wet opacifying agent; and (b) adding the pre-made wet opacifying agent to a fluorescent dye. Preferably, the pre-made wet opacifying agent comprises a resin, solvent, an opacifying agent and a chemical dispersant.

In another embodiment of the invention, a method for stabilizing an opacifying agent in the fluorescent ink composition of the present invention comprises: (a) formulating an opacifying agent or mixture thereof, a resin or mixture thereof, and a fluorescent dye or a mixture thereof into a dry chip; and (b) proportionally adding the dry chip to a mixture of solvent, chemical dispersant, and optionally resin, to create a premix; and (c) proportionally adding to the premix a mixture of solvent(s), resin(s) and other additives.

DETAILED DESCRIPTION OF THE INVENTION

As used herein, the term "fluorescence" refers to the emission of visible light after absorbing daylight radiation.

As used herein, the term "fluorescent dye" is a dyestuff which exhibits the phenomenon of fluorescence in the visible region of the spectrum. Any fluorescent dye can be used. Examples of daylight fluorescent dyes are dyes in the rhodamine, fluorescein, coumarin, naphthalimide, benzoanthene and acridine dye families. Suppliers of fluorescent colorants include Radiant Color Company (Richmond, Calif.), Day-Glo Color Corp. (Cleveland, Ohio), Sun Chemical Co. (Cincinnati, Ohio). Sinloihi Co. Ltd. (Tokyo, Japan), Swada (London, England),Mikuni Color Works Ltd. (Himaji, Japan), Matsui International Co, Inc (Japan), and Nippon Keiko Color Company (Japan).

As used herein, the term "masscolor" is the color when viewed by reflected light of an ink of such thickness to obscure completely the background.

As used herein, the term "dispersing agent" is a surface-active agent added to a suspending medium to promote uniform and maximum suspension of fine solid particles. Examples of chemical dispersants for use in non-aqueous solvents include, but are not limited to, sterols, lecithin and fatty acids.

As used herein, the term "stabilizer" is an additive for inks to prevent the discoloration and changes in the viscosity of the ink with the passage of time. Examples of stabilizers are dihydroxybenzene derivatives, such as hydroquinone, and hydroxybenzenes, such as butylated hydroxy toluene.

As used herein, the term "plasticizer" is an organic additive and is used to make the ink film more flexible. Examples of plasticizers are nonvolatile organic liquids and low melting solids, such as phthalate, adipate and sebacate esters, tricresyl phosphate and castor oil.

As used herein, the term "about" should be understood to refer to all such numbers, including all numbers in a range.

The ink composition of the present invention comprises an opacifying agent, preferably silica ($SiO_2$), but may be one of many such opacifying agents known within the art, including but not limited to the following: titanium dioxide, zinc oxide, zirconium oxide, clays, talc, silicates and calcium carbonate. In a preferred embodiment, the refractive index of the opacifying agent is less that than 2.0. In the preferred embodiment of this invention, the opacifying agent is stabilized before its addition to the fluorescent ink base.

Representative refractive indices of compounds are disclosed in Table 1:

TABLE 1

| Substance | Refractive index* |
|---|---|
| China Clay | 1.6 |
| Talc | 1.6 |
| Silicate glasses | 1.5–1.9 |
| Organic polymers | 1.4–1.6 |
| Silica | 1.5–1.6 |
| Zirconium dioxide | 2.2 |
| Zinc oxide | 2.0 |
| Zinc sulfide | 2.4 |
| Anatase titanium dioxide | 2.5 |
| Rutile titanium dioxide | 2.7 |

*Rounded off for ease of comparison

The ink composition contains an opacifying agent that is stabilized using a combination of various chemical dispersants and mixing/dispersing procedures which are commonly practiced in the art.

A chemical dispersant may be used alone or in the form of a mixture of two or more chemical dispersants. Examples of chemical dispersants include, but are not limited to, sterols, lecithin and fatty acids. Preferably, the chemical dispersant is selected from the group consisting of an oleophilic dispersing agent, such as Disperbyk 111 (made by BYK Chemie in Connecticut), an acid functional co-polymer dispersing agent, such as Solsperse 20000 (made by AVECIA Ltd in Charlotte, N.C.), and soya lecithin (made by ADM in Chicago, Ill.).

An opacifying agent may be used alone or in the form of a mixture of two or more opacifying agents. Preferably, the opacifying agent used in this invention is silica and is supplied in a powder form or in the form of a non-aqueous slurry. Preferably, the particle diameter of the opacifying agent is less than 1 micron. Most preferably, the particle diameter is from about 0.02 to about 0.6 microns. An example of a preferred opacifying agent is Nanosil, a silica available from ASP Technologies (Chicago, Ill.)

The ink composition using $TiO_2$ as the opacifying agent is preferably supplied in a powder or non-aqueous slurry form. These $TiO_2$ particles range in size from 0.001 to about 5 microns in size; preferably within a range of about 0.01 to about 0.5 microns. Examples of $TiO_2$ powders used in this invention are: OR-580 made by American Cyanamid (CT), $TiO_2$ P-25 made by Degussa (Germany), the MT series (MT-500B and MT-500SA) made by Tayca Preparation (Japan) and the TTO-S series made by Ishihara Sangyo Kaisha, Ltd. (Japan).

A solvent may be used alone or in the form of a mixture of two or more solvents. The ink solvents of the present invention are those used for conventional writing instruments. These solvents, known in the art, include but not are not limited to: polyols, such as dipropylene glycol; polyol ethers, such as triethylene glycol monobutyl ether; hydrocarbons; high boiling point esters such as octyl adipate, dioctyl sebacate; glycerin and its derivatives; ketones such as cyclohexanone; pyrrolidones, such as N-methyl pyrrolidone; lactones; and high boiling point alcohols, such as benzyl alcohol. The organic solvent is usually in an amount of about 5 to about 90 weight percent, preferably about 20 to about 65 weight percent. An example of a preferred solvent is Dowanol EPH, a 2-phenoxyethanol compound available from Dow Chemicals (Midland, Mich.). The use of solvent in excess of these results in insufficiently intense writing, whereas the use of solvent in amounts too small the resultant ink composition has too high a viscosity and writes poorly.

The ink composition of the present invention contains a solvent soluble fluorescent colorant. A colorant may be used alone or in the form of a mixture of two or more colorants. This colorant has a fluorescent or brilliant color when it receives daylight or artificial light. The fluorescent colorants used in the present invention are commercially available, among which are, for example: the Sunbrite series (257ex10, 256ex44, etc.) made by Sun Chemical Company in Cincinnati, Ohio; and the MPI series (MPI-504C, -505C, -507C, etc.) made by Nippon Keiko Kagaku Co. Ltd. in Japan.

The ink composition of the invention contains fluorescent colorants in an amount of about 0.1 to about 60 weight percent, based on the ink composition. When the colorant is used in excess, the resultant ink composition is costly without significant increase in line intensity, whereas when the dye is used in too small an amount, the resultant ink composition does not write with sufficient line intensity.

The ink composition of the invention may contain a resin in an amount of about 0.1 to about 60 weight percent, preferably about 1.0 to about 30 weight percent, based on the ink composition. A resin may be used alone or in the form of a mixture of two or more resins. Resins suitable for use in this invention include thermoplastic and thermosetting polymers. Illustrative examples include, but are not limited to, polyvinyl pyrrolidone, polyesters, polystyrene, high impact polystyrene, polystyrene copolymers, acrylonitrile butadiene copolymers, polyisobutylene, polyvinyl chloride, polyvinylidene chloride, polyvinyl acetals, polyacrylonitrile, polyacrylates, polymethacrylates, polybutadiene, ethylene vinyl acetate, polyamides, polyimides, polyoxymethylene, polysulfones, polyphenylene sulfide, melamines, vinyl esters, epoxies, polycarbonates, polyurethanes, polyacetals, phenolics, polyester carbonate, polyethers, polyethylene terephthalate, polytrimethylene terephthalate, polybutylene terephthalate, polyarylates, polyarylene sulfides, polyketones, polyethylene, high density polyethylene, polypropylene, hydrocarbon resins, rosin esters, copolymers, grafts, blends or mixtures thereof. The copolymers and blends of these polymers are well known to those skilled in the art, as are polymers which may serve as a backbone or a grafted polymer in graft polymers. Preferably, the resin type is a ketone or styrene allyl alcohol. An example of commercially available ketone resin is Synthetic Resin SK available from Creanova Inc. in Somerset, N.J.

Additional components which may be added to the ink compositions of the present invention include surfactants, heat and light stabilizers, lubricants, optical brighteners, metal deactivators.

The surfactant may be either anionic, nonionic or amphoteric. The anionic surfactant usable includes, for instance, sulfonated fatty acid ester such as dioctyl sodium sulfosuccinate, higher alcohol sulfate, polyoxyethylene alkyl phenyl ether sulfate, alkyl aryl sulfonate or olefin sulfonate. The nonionic surfactant usable includes, for instance, polyoxyethylene ether compound such as polyoxyethylene alkyl ether or polyoxyethylene alkyl phenyl ether, polyhydric alcohol fatty acid ester or polyhydric alcohol fatty acid ester polyoxyethylene ether. The ink composition may contain a surfactant in an amount of not more than about 10 weight percent, preferably in the range of about 0.2 to about 5 weight percent, based on the ink composition. A surfactant may be used alone or in the form of a mixture of two or more surfactants.

A heat stabilizer may be used alone or in the form of a mixture of two or more heat stabilizers. Examples of heat stabilizers include, but are not limited to, (1) hindered phenols [such as Alvinox 100 made by 3V Inc. in Charlotte, N.C. or BNX 1000 made by Mayzo Inc in Norcross, Ga. or BHT (butylated hydroxy toluene) made by Miles in Pittsburgh, Pa. or Vanox SKT made by Vanderbilt Chemical Co in Connecticut], (2) alkylidene bis, tris, and polyphenols [such as the Cyanox series (425, 1790, 2246) made by CYTEC in Perrysburg, Ohio ], (3) thio bis, tris and polyalkylated phenols [such as Irganox 1035 made by Ciba Geigy in Basel, Switzerland], (4) amines [such as PTZ phenothiazine made by Zeneca Specialties in England or the Naugard series (A, J, Q, SA, 445) made by Uniroyal Chemical Co in Connecticut], (5) esters [such as the Argus series (DLTDP, DSTDP, DMTDP, DTDTDP) Witco Polymer Additives in Greenwich, Conn.], (6) organic phosphites and phosphates [such the Albrite series (BTD HP, DBHP, DLHP, ETC.) made by Albright & Wilson located in Richmond, Va.], (7) propyl gallate made by Eastman Chemical Co in Tennessee, and (8) hydroquinone made by Monsanto Chemical Co in St. Louis, Mo.

A light stabilizer may be used alone or in the form of a mixture of two or more light stabilizers. Examples of light stabilizers include, but are not limited to, (1) benzophenone derivatives [such as the UVINUL series (3000, 3035, 3039, 3049, etc.) made by BASF in Germany], (2) benzotriazole derivatives [such as the TINUVIN series (213, 234, 328, 326) made by Ciba Geigy in Basel, Switzerland], (3) salicylates [such as phenyl salicylate made by Eastman Chemical Co in Kingsport, Tenn.], (4) nickel organics [UV Chek made by Ferro Chemical Co in Cleveland, Ohio], (5) resorcinol monobenzoate made by Eastman, (6) formamidine derivatives [tradename Givsorb UV-1, UV-2 made by Givaudan-Roure in Clifton, N.J.], (7) oxlanilide derivatives [tradename Sanduvor VSU or 3206 made by Sandoz in Charlotte, N.C.], and (8) hindered amines [such as the Cyasorb series (UV 500, UV 516, UV 3346, 3581, 36040 made by CYTEC in Connecticut.]

A lubricant may be used alone or in the form of a mixture of two or more lubricants. Examples of lubricants include, but are not limited to, (1) alcohol esters [tradename Flexricin P-1, P-4, P-6 made by CasChem in Newark, N.J.], (2) amides [tradename Crodamide EBS, EBO, ER, OR, etc made by Croda Universal Ins in Arlington, Tex.,], (3) polyol esters [such as tradename Glycolube P made by Lonza in Fair Lawn, N.J.], (4) fatty acids [such as tradename Croacid made by Croda], (5) fatty alcohols [such as tradename Unilin 350, 425, 550 made by Petrolite Company in Oklahoma], (6) silicones [such as tradename 200, 203, MB50-001, fluids made by Dow Corning in Midland Mich.], (7) liquid polyolefins [such as VERSAFLOW made by Shamrock Chemical Co in Newark, N.J.] and (8) fatty acid.metal salts, such as zinc stearate made by Witco Corp in Greenwich, Conn.

An optical brightener may be used alone or in the form of a mixture of two or more optical brighteners. Examples of optical brighteners include, but are not limited to, Tinopal CBS-X, SWV con 110# made by Ciba Geigy in Basel, Switzerland; D-2550, D-2100 available from Acme Hardestry in Blue Bell, Pa.

A metal deactivator may be used alone or in the form of a mixture of two or more metal deactivators. Examples of metal deactivators include, but are not limited to, tradenames Citrosol 50W, 50T, 50E made by Pfizer Chemical Co in New Haven, Conn.; Cheelox HE-24, NTA-14 made by GAF Corporation in New Jersey; Chel DM-41, DPTA and Irganox 1024 made by Ciba Geigy in Basel, Switzerland; and Vanlube 705 made by R. T. Vanderbilt Company in Norwalk, Conn.

The stabilization of the opacifying agent in the invention can be performed using several methods. These methods are best described by using the following examples; however, the invention is not limited thereto. All components are listed as parts by weight unless otherwise noted.

EXAMPLES

Example 1

Preparation of Dry Opacifying Agent Dispersed In Fluorescent Pigment Dispersion

To prepare the dry opacifying agent dispersed in a fluorescent pigment dispersion, the following components are blended as shown in Table 2:

TABLE 2

| COMPONENTS | A | B | C | D | E |
|---|---|---|---|---|---|
| Resin SK* | 25 pbw | 25 | 25 | 25 | 25 |
| Benzyl Alcohol | 35 | 35 | 35 | 35 | 35 |
| 2-phenoxyethanol | 28 | 28 | 28 | 28 | 28 |

*Resin SK is a ketone resin available from Creanova

After blending the above agents, add and dissolve the following as disclosed in Table 3.

TABLE 3

| Sun Fluorescent Dye* | A | B | C | D | E |
|---|---|---|---|---|---|
| 257 ex 10 | 10 pbw | | | | |
| 256 ex 44 | | 10 | | | |
| 251 ex 54 | | | 10 | | |

TABLE 3-continued

| Sun Fluorescent Dye* | A | B | C | D | E |
|---|---|---|---|---|---|
| 250 ex 36 | | | | 10 | |
| 257 ex 17 | | | | | 10 |

*Fluorescent dyes available from Sun Chemical (Cincinnati, OH).

As shown in Table 4 after dissolving the colorant, add the chemical dispersant, then disperse the Nanosil opacifying agent under high speed agitation.

TABLE 4

| | A | B | C | D | E |
|---|---|---|---|---|---|
| Dispersants, (e.g., Disperbyk 111, Solsperse 20000, and/or Soya Lecithin) | 1 pbw | 1 | 1 | 1 | 1 |
| Nanosil* | 1 pbw | 1 | 1 | 1 | 1 |

*Nanosil is a silica available from ASP Technologies

Example 2

Preparation Of A Pre-Made Wet Opacifying Agent Dispersion (low Nanosil concentration)

To make the following pre-made opacifying agent dispersion, mix the following as shown in Table 5.

TABLE 5

| COMPONENTS | PREMIX A |
|---|---|
| Resin SK* | 50 parts by weight |
| Benzyl Alcohol | 50 |
| Stabilizers, Surfactants, and/or Antioxidants | 1 to 5 |
| Nanosil** | 1 |

*Resin SK is a ketone resin available from Creanova
**Nanosil is a silica available from ASP Technologies Then, compound the above mixture (Premix A, see Table 5) as follows:

TABLE 6

| COMPONENTS | |
|---|---|
| Premix A | 100 parts by weight |
| Sun Fluorescent Dye* | 10 |

*Fluorescent dyes available from Sun Chemical (Cincinnati, OH).

Example 3

Preparation of Pre-Made Wet Opacifying Agent Dispersion (high Nanosil Concentration)

To make a pre-made opacifying agent dispersion, mix the following as shown in Table 7:

TABLE 7

| COMPONENTS | PREMIX B |
|---|---|
| Resin SK* | 50 parts by weight |
| Benzyl Alcohol | 50 pbw |
| Dispersants (Dysperbyk 111 or Solsperse 20000 and/or soya lecithin) | 1 to 5 parts by weight |
| Nanosil** | 50 pbw |

*Resin SK is a ketone resin available from Creanova.
**Nanosil is a silica available from ASP Technologies Then combine the following materials under agitation as shown in Table 8:

TABLE 8

| COMPONENTS | |
|---|---|
| Premix B | 25 parts by weight |
| Benzyl Alcohol | 35 |
| 2-phenoxyethanol | 28 |
| Sun Fluorescent Dye** | 10 |

**Fluorescent dyes available from Sun Chemical (Cincinnati, OH).

Example 4

Preparation of Dry Opacifyiny Agent Chip Dispersion

To prepare the dry chip formulation in a conventional two-roll mill, mix the following components as shown in Table 9:

TABLE 9

| COMPONENT | CHIP 1. |
|---|---|
| Styrene Allyl Alcohol Resin (SAA) | 80 parts by weight |
| Nanosil* | 2 |
| Sun Fluorescent Dye** | 50 |

*Nanosil is a silica available from ASP Technologies
**Fluorescent dyes available from Sun Chemical (Cincinnati, OH).

Then proportionally add 60.0 grams of benzyl alcohol to 40.0 gms of the above CHIP 1 mixture.

Then add under agitation, 30.0 grams of SAA and 0.15 grams polyvinyl pyrrolidone (PVP K-90). Once the SAA is dissolved, the measured viscosity is 13,000 cPs at 20° C.

Example 5

Preparation of Dry $TiO_2$ Chip Dispersion

To formulate the dry chip formulation, mix the following components as shown in Table 10:

TABLE 10

| COMPONENT | CHIP 2. |
|---|---|
| Styrene Allyl Alcohol Resin (SAA) | 80 |
| $TiO_2$ | 2 |
| Fluorescent Dye* | 50 |

*Made by Sun Chemical Company in Cincinnati, Ohio

Separately, mix 70.0 grams benzyl alcohol with 20.0 SAA 101 to make a benzyl alcohol/SAA mixture. Add stepwise 47.5 grams of CHIP 2 (see Table 10) to the benzyl alcohol/SAA mixture and then add 20.0 grams of SAA 101. Mix. At 20° C., the above mixture has a viscosity of 11,500 cPs.

All patents cited in the foregoing text are expressly incorporated herein by reference in their entirety.

It will be understood that the claims are intended to cover all changes and modifications of the preferred embodiments of the invention, herein chosen for the purpose of illustration, which do not constitute a departure from the spirit and scope of the invention.

We claim:

1. A fluorescent ink composition for use in a writing instrument comprising an organic solvent, a resin, a solvent soluble fluorescent colorant and an opacifying agent, whereby the opacifying agent acts as a brightener.

2. A fluorescent ink composition of claim 1, wherein the ink composition has a viscosity from about 1000 cPs to about 500,000 cPs at 20° C.

3. A fluorescent ink composition of claim 2, wherein the ink composition has a viscosity from about 2000 cPs to about 50,000 cPs at 20° C.

4. A fluorescent ink composition of claim 3, wherein the ink composition has a viscosity from 3000 cPs to about 30,000 cPs at 20° C.

5. The fluorescent ink composition as claimed in claim 1 wherein the opacifying agent, with a refractive index less than 2, is 0.1 to about 15 weight percent of the ink composition.

6. The fluorescent ink composition of claim 5, wherein the opacifying agent is selected from the group consisting of silica, silicates, calcium carbonate, talc and china clay.

7. The fluorescent ink composition of claim 6, wherein the opacifying agent is silica.

8. The fluorescent ink composition of claim 7, wherein the particle diameter of the opacifying agent is from about 0.02 to about 0.6 microns.

9. The fluorescent ink composition of claim 1, wherein the opacifying agent, with a refractive index equal to or greater than 2, is 0.1 to 4.9 weight percent of the ink composition.

10. The fluorescent ink composition of claim 9, wherein the opacifying agent is selected from the group consisting of titanium dioxide, zinc oxide, zinc sulfide and zirconium oxide.

11. The fluorescent ink composition of claim 9, wherein the opacifying agent has a particle diameter from about 0.001 to about 5 microns.

12. The fluorescent ink composition of claim 11, wherein the opacifying agent has a particle diameter from about 0.01 to about 0.5 microns.

13. The fluorescent ink composition of claim 1, wherein the organic solvent is selected from the group consisting of hydrocarbons, alcohols, polyols, polyol ethers, ketones, pyrrolidones, lactones and mixtures thereof.

14. The fluoresecent ink composition of claim 13, wherein the hydrocarbon solvent is selected from the group consisting of aliphatic hydrocarbons, napthenic hydrocarbons and aromatic hydrocarbons.

15. The fluorescent ink composition of claim 1, wherein the organic solvent is from about 5 to about 90 weight percent of the ink composition.

16. The fluorescent ink composition of claim 15, wherein the organic solvent is from about 20 to about 65 weight percent of the ink composition.

17. The ink composition of claim 1, wherein the resin is from about 0.1 to about 60 weight percent of the ink composition.

18. The ink composition of claim 1, wherein the resin is from about 1 to about 30 weight percent of the ink composition.

19. The fluorescent ink composition as claimed in claim 1, wherein the resin is selected from the group consisting of polyvinyl pyrrolidone, polyesters, polystyrene, high impact polystyrene, styrene copolymers, acrylonitrile butadiene copolymers, polyisobutylene, polyvinyl chloride, polyvinylidene chloride, polyvinyl acetals, polyacrylonitrile, polyacrylates, polymethacrylates, polybutadiene, ethylene vinyl acetate, polyamides, polyimides, polyoxymethylene, polysulfones, polyphenylene sulfide, melamines, vinyl esters, epoxies, polycarbonates, polyurethanes, polyacetals, phenolics, polyester carbonate, polyethers, polyethylene terephthalate, polytrimethylene terephthalate, polybutylene terephthalate, polyarylates, polyarylene sulfides, polyketones, polyethylene, high density polyethylene, polypropylene, rosin esters, hydrocarbon resins, copolymers, grafts, blends, and mixtures thereof.

20. A fluorescent ink composition for use in a writing instrument comprising an organic solvent, a resin, a solvent soluble fluorescent colorant, a chemical dispersant and an opacifying agent, whereby the opacifying agent acts as a brightener.

21. The fluorescent ink composition of claim 20, wherein the chemical dispersant is an oleophilic chemical dispersant, an acid function co-polymer chemical dispersant or soya lecithin.

22. The fluorescent ink composition of claim 1, further comprising a stabilizer.

23. The ink composition of claim 22, wherein the stabilizer is present in an amount from about 0.1 to about 30 weight percent of the ink composition.

24. The ink composition of claim 23, wherein the stabilizer is present in an amount from about 0.1 to about 10 weight percent of the ink composition.

25. The ink composition of claim 24, wherein the stabilizer is present in amounts from about 0.1 to about 5 weight percent of the ink composition.

26. A fluorescent ink composition for use in a writing instrument comprising an organic solvent, a resin, a solvent soluble fluorescent colorant, an antioxidant, and an opacifying agent, whereby the opacifying agent acts as a brightener.

27. The ink composition of claim 26, wherein the antioxidant is selected from the group consisting of tocopherals, butylated hydroxy toluene, eugenol and hydroquinone.

28. The ink composition of claim 26, wherein the antioxidant is present in an amount from about 0.1 to about 30 weight percent of the ink composition.

29. The fluorescent ink composition of claim 1, further comprising a surfactant.

30. The fluorescent ink composition of claim 1, wherein the fluorescent colorant is present in an amount from about 0.1 to about 60 weight percent of the ink composition.

31. The fluorescent ink composition of claim 1, wherein the writing instrument is a ballpoint pen.

* * * * *